(12) United States Patent
Abarra et al.

(10) Patent No.: US 6,602,612 B2
(45) Date of Patent: *Aug. 5, 2003

(54) MAGNETIC RECORDING MEDIUM AND MAGNETIC STORAGE APPARATUS

(75) Inventors: E. Noel Abarra, Kawasaki (JP); Iwao Okamoto, Kawasaki (JP); Yoshifumi Mizoshita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/938,032

(22) Filed: Aug. 23, 2001

(65) Prior Publication Data

US 2001/0055701 A1 Dec. 27, 2001

Related U.S. Application Data

(62) Division of application No. 09/425,788, filed on Oct. 22, 1999.

(30) Foreign Application Priority Data

Jun. 8, 1999 (JP) .................................... 11-161329

(51) Int. Cl.$^7$ .............................. G11B 5/66; G11B 5/70; H01F 1/00; B32B 15/00
(52) U.S. Cl. ................ 428/611; 428/336; 428/694 TM; 428/668; 428/900; 360/97.01
(58) Field of Search ........................ 428/694 TM, 336, 428/900, 65.3, 611, 668; 360/97.01

(56) References Cited

U.S. PATENT DOCUMENTS

| | | | |
|---|---|---|---|
| 4,677,032 A | 6/1987 | Robinson | 428/611 |
| 4,789,598 A | 12/1988 | Howard et al. | 428/408 |
| 5,051,288 A | 9/1991 | Ahlert et al. | 428/64 |
| 5,147,732 A | 9/1992 | Shiroishi et al. | 428/668 |

(List continued on next page.)

FOREIGN PATENT DOCUMENTS

| | | |
|---|---|---|
| DE | 197 00 506 A1 | 7/1997 |
| EP | 0 892 393 A1 | 1/1999 |
| GB | 2-355-018 A | 4/2001 |
| JP | 06-349047 | 12/1994 |
| JP | 07-121863 | 5/1995 |
| JP | 07-134820 | 5/1995 |
| JP | 07-176027 | 7/1995 |
| JP | 08-129738 | 5/1996 |
| JP | 09-147349 | 6/1997 |
| JP | 09-198641 | 7/1997 |
| JP | 10-040528 | 2/1998 |
| JP | 10-149526 A | 6/1998 |
| JP | 10-289434 | 10/1998 |
| JP | 1173621 | 3/1999 |
| JP | 11-328646 A | 11/1999 |
| WO | WO 96/24927 | 8/1996 |
| WO | WO 97/34295 | 9/1997 |

OTHER PUBLICATIONS

Akopyan et al., "Study Of A Change In The Lattice Constant Of A Ruthenium–Based Ternary Solid Solution By Mathematical Planning Of An Experiment," Izv. Akad. Nauk SSR, Met., (1976) (3), 210–214.

(List continued on next page.)

*Primary Examiner*—Holly Rickman
(74) *Attorney, Agent, or Firm*—Greer, Burns & Crain, Ltd.

(57) ABSTRACT

A magnetic recording medium is provided with at least one exchange layer structure, and a magnetic layer formed on the exchange layer structure. The exchange layer structure includes a ferromagnetic layer, and a non-magnetic coupling layer provided on the ferromagnetic layer and under the magnetic layer. The ferromagnetic layer and the magnetic layer have antiparallel magnetizations.

13 Claims, 7 Drawing Sheets

U.S. PATENT DOCUMENTS

| | | | |
|---|---|---|---|
| 5,408,377 A | 4/1995 | Gurney et al. | 360/113 |
| 5,462,796 A | 10/1995 | Teng et al. | 428/336 |
| 5,465,185 A | 11/1995 | Heim et al. | 360/113 |
| 5,493,465 A | 2/1996 | Kamiguchi et al. | 360/113 |
| 5,523,173 A | 6/1996 | Doerner et al. | 428/611 |
| 5,580,667 A | 12/1996 | Lal et al. | 428/610 |
| 5,607,740 A | 3/1997 | Noda | 428/65.3 |
| 5,688,380 A | 11/1997 | Koike et al. | 204/192.2 |
| 5,693,426 A | 12/1997 | Lee et al. | 428/611 |
| 5,701,223 A | 12/1997 | Fontana, Jr. et al. | 360/113 |
| 5,736,262 A | 4/1998 | Ohkijima et al. | 428/611 |
| 5,756,202 A | 5/1998 | Van Kesteren et al. | 428/332 |
| 5,834,111 A | 11/1998 | Lal et al. | 428/332 |
| 5,840,394 A | 11/1998 | Ranjan et al. | 428/65.3 |
| 5,843,569 A | 12/1998 | Kaitsu et al. | 428/323 |
| 5,851,643 A | 12/1998 | Honda et al. | 428/212 |
| 5,851,656 A | 12/1998 | Ohkubo | 428/332 |
| 5,898,549 A | 4/1999 | Gill | 360/113 |
| 5,922,456 A | 7/1999 | Tanahashi et al. | 428/332 |
| 6,013,365 A | 1/2000 | Dieny et al. | 428/332 |
| 6,077,586 A | 6/2000 | Bian et al. | 428/65.3 |
| 6,143,388 A | 11/2000 | Bian et al. | 428/65.3 |
| 6,150,016 A | 11/2000 | Song et al. | 428/332 |
| 6,221,481 B1 | 4/2001 | Wu et al. | 428/332 |
| 6,248,395 B1 | 6/2001 | Homola | 427/129 |
| 6,280,813 B1 | 8/2001 | Carey et al. | 428/65.3 |
| 2001/0038931 A1 | 11/2001 | Carey et al. | 428/694 |

OTHER PUBLICATIONS

Ounadjela et al., "Field–Dependent Antiferro–Ferromagnetic Transition In Co/Ru Superlattices," J. Appl. Phys., Nov. 15, 1991, vol. 70, Issue 10, p. 5877.

Okamoto et al.; "Rigid Disk Medium for 5 Gb/in$^2$ Recording;" IEEE Intermag 1996 Digest.

Hosoe et al.; "Experimental Study of Thermal Decay in High–Density Magnetic Recording Media;" IEEE Trans. Magn.; vol. 33, p. 1528; 1997.

Lu et al.; "Thermal Instability at 10 Gb/in$^2$ Magnetic Recording;" IEEE Trans. Magn.; vol. 30, No. 6, pp. 4230–4232; Nov. 1994.

Abarra et al.; "Thermal Stability of Narrow Track Bits in a 5 Gb/in$^2$ Medium;" IEEE Trans. Magn.; vol. 33, p. 2995; 1997.

He et al.; "High–Speed Switching in Magnetic Recording Media;" Journal of Magnetism and Magnetic Materials; vol. 155, pp. 6–12; 1996.

Akimoto et al.; "Relationship Between Magnetic Circumferential Orientation and Magnetic Thermal Stability;" J. Magn. Magn. Mater.; 1999.

Abarra et al.; "The Effect of Orientation Ratio on the Dynamic Coercivity of Media for <15 5 Gb/in$^2$ Recording;" EB–02, Intermag.; Korea; 1999.

Richter et al.; "Dynamic Coercivity Effects in Thin Film Media;" IEEE Trans. Magn., vol. 34, p. 1540; 1997.

Lu et al.; "Magnetic Viscosity in High–Density Recording;" J. Appl. Phys., vol. 75, p. 5768; 1994.

S.S.P. Parkin; "Systematic Variation of the Strength and Oscillation Period of Indirect Magnetic Exchange Coupling Through the 3d, 4d, and 5d Transition Metals;" Phys. Rev. Lett., vol. 67, p. 3598; 1991.

Pu–Ling Lu and Stanley H. Charap; "High Density Magnetic Recording Media Design and Identification: Susceptibility to Thermal Decay;" IEEE Transactions on Magnetics, vol. 31, No. 6; Nov. 1995.

Y. Kawato et al.; "Spin Valve Films with Synthetic Ferrimagnets (Co/Ru/Co) for Pinned Layers;" (source and year unknown).

S.E. Lambert, et al., "Reduction of Media Noise in Thin Film Metal Media by Lamination"–IEEE Transactions on Magnetics, vol. 26, No. 5, Sep. 1990, pp. 2706–2708.

E.S. Murdock, et al., "Noise Properties of Multilayered Co–Alloy Magnetic Recording Media"–IEEE Transactions on Magnetics, vol. 26, No. 5, Sep. 1990, pp. 2700–2705.

A. Murayama, et al., "Interlayer Exchange Coupling in Co/Cr/Co Double Layered Recording Films Studied by Spin–Wave Brillouin Scattering"–IEEE Transactions on Magnetics, vol. 27, No. 6, Nov. 1991, pp. 5064–5066.

S.E. Lambert, et al., "Laminated Media for High Density Recording"–IEEE Transactions on Magnetics, vol. 29, No. 1, Jan. 1993, pp. 223–229.

E. Teng, et al., "Flash Chromium Interlayer for High Performance Disks with Superior Noise and Coercivity Squareness"–IEEE Transactions on Magnetics, vol. 29, No. 6, Nov. 1993, pp. 3679–3681.

S.S.P. Parkin et al., "Oscillations in Exchange Coupling and Magnetoresistance Superlattice Structures: Co/Ru, Co/Cr, and Fe/Cr", Physical Review Letters, vol. 64, No. 19, May 7, 1990, pp. 2304–2307.

Baibich et al., "Giant Magnetoresistance of (001)Fe(001)CR Magnetic Superlattices," Physical Review Letters, vol. 61, No.21, Nov. 21, 1988.

MAGNETIC RECORDING MEDIUM AND MAGNETIC STORAGE APPARATUS

This is a divisional of application Ser. No. 09/425,788, filed Oct. 22, 1999 pending.

BACKGROUND OF THE INVENTION

1. Field of the Invention

The present invention generally relates to magnetic recording media and magnetic storage apparatuses, and more particularly to a magnetic recording medium and a magnetic storage apparatus which are suited for high-density recording.

2. Description of the Related Art

The recording density of longitudinal magnetic recording media, such as magnetic disks, has been increased considerably, due to the reduction of medium noise and the development of magnetoresistive and high-sensitivity spin-valve heads. A typical magnetic recording medium is comprised of a substrate, an underlayer, a magnetic layer, and a protection layer which are successively stacked in this order. The underlayer is made of Cr or a Cr-based alloy, and the magnetic layer is made of a Co-based alloy.

Various methods have been proposed to reduce the medium noise. For example, Okamoto et al., "Rigid Disk Medium For 5 Gbit/in$^2$ Recording", AB-3, Intermag '96 Digest proposes decreasing the grain size and size distribution of the magnetic layer by reducing the magnetic layer thickness by the proper use of an underlayer made of CrMo, and a U.S. Pat. No. 5,693,426 proposes the use of an underlayer made of NiAl. Further, Hosoe et al., "Experimental Study of Thermal Decay in High-Density Magnetic Recording Media", IEEE Trans. Magn. Vol. 33, 1528 (1997), for example, proposes the use of an underlayer made of CrTiB. The underlayers described above also promote c-axis orientation of the magnetic layer in a plane which increases the remanence magnetization and the thermal stability of written bits. In addition, proposals have been made to reduce the thickness of the magnetic layer, to increase the resolution or to decrease the width of transition between written bits. Furthermore, proposals have been made to decrease the exchange coupling between grains by promoting more Cr segregation in the magnetic layer which is made of the CoCr-based alloy.

However, as the grains of the magnetic layer become smaller and more magnetically isolated from each other, the written bits become unstable due to thermal activation and to demagnetizing fields which increase with linear density. Lu et al., "Thermal Instability at 10 Gbit/in$^2$ Magnetic Recording", IEEE Trans. Magn. Vol. 30, 4230 (1994) demonstrated, by micromagnetic simulation, that exchange-decoupled grains having a diameter of 10 nm and ratio $K_u V/k_B T \approx 60$ in 400 kfci di-bits are susceptible to significant thermal decay, where $K_u$ denotes the magnetic anisotropy constant, V denotes the average magnetic grain volume, $k_B$ denotes the Boltzmann constant, and T denotes the temperature. The ratio $K_u V/k_B T$ is also referred to as a thermal stability factor.

It has been reported in Abarra et al., "Thermal Stability of Narrow Track Bits in a 5 Gbit/in$^2$ Medium", IEEE Trans. Magn. Vol. 33, 2995 (1997) that the presence of intergranular exchange interaction stabilizes written bits, by MFM studies of annealed 200 kfci bits on a 5 Gbit/in$^2$ CoCrPtTa/CrMo medium. However, more grain decoupling is essential for recording densities of 20 Gbit/in$^2$ or greater.

The obvious solution has been to increase the magnetic anisotropy of the magnetic layer. But unfortunately, the increased magnetic anisotropy places a great demand on the head write field which degrades the "overwrite" performance which is the ability to write over previously written data.

In addition, the coercivity of thermally unstable magnetic recording medium increases rapidly with decreasing switching time, as reported in He et al., "High Speed Switching in Magnetic Recording Media", J. Magn. Magn. Mater. Vol. 155, 6 (1996), for magnetic tape media, and in J. H. Richter, "Dynamic Coercivity Effects in Thin Film Media", IEEE Trans. Magn. Vol. 34, 1540 (1997), for magnetic disk media. Consequently, the adverse effects are introduced in the data rate, that is, how fast data can be written on the magnetic layer and the amount of head field required to reverse the magnetic grains.

On the other hand, another proposed method of improving the thermal stability increases the orientation ratio of the magnetic layer, by appropriately texturing the substrate under the magnetic layer. For example, Akimoto et al., "Relationship Between Magnetic Circumferential Orientation and Magnetic Thermal Stability", J. Magn. Magn. Mater. (1999), in press, report through micromagnetic simulation, that the effective ratio $K_u V/k_B T$ is enhanced by a slight increase in the orientation ratio. This further results in a weaker time dependence for the coercivity which improves the overwrite performance of the magnetic recording medium, as reported in Abarra et al., "The Effect of Orientation Ratio on the Dynamic Coercivity of Media for >15 Gbit/in$^2$ Recording", EB-02, Intermag '99, Korea.

Furthermore, keepered magnetic recording media have been proposed for thermal stability improvement. The keeper layer is made up of a magnetically soft layer parallel to the magnetic layer. This soft layer can be disposed above or below the magnetic layer. Oftentimes, a Cr isolation layer is interposed between the soft layer and the magnetic layer. The soft layer reduces the demagnetizing fields in written bits on the magnetic layer. However, coupling the magnetic layer to a continuously-exchanged coupled soft layer defeats the purpose of decoupling the grains of the magnetic layer. As a result, the medium noise increases.

Various methods have been proposed to improve the thermal stability and to reduce the medium noise. However, there was a problem in that the proposed methods do not provide a considerable improvement of the thermal stability of written bits, thereby making it difficult to greatly reduce the medium noise. In addition, there was another problem in that some of the proposed methods introduce adverse effects on the performance of the magnetic recording medium due to the measures taken to reduce the medium noise.

More particularly, in order to obtain a thermally stable performance of the magnetic recording medium, it is conceivable to (i) increase the magnetic anisotropy constant $K_u$, (ii) decrease the temperature T or, (iii) increase the grain volume V of the magnetic layer. However, measure (i) increases the coercivity, thereby making it more difficult to write information on the magnetic layer. In addition, measure (ii) is impractical since in magnetic disk drives, for example, the operating temperature may become greater than 60° C. Furthermore, measure (iii) increases the medium noise as described above. As an alternative for measure (iii), it is conceivable to increase the thickness of the magnetic layer, but this would lead to deterioration of the resolution.

SUMMARY OF THE INVENTION

Accordingly, it is a general object of the present invention to provide a novel and useful magnetic recording medium and magnetic storage apparatus, in which the problems described above are eliminated.

Another and more specific object of the present invention is to provide a magnetic recording medium and a magnetic storage apparatus, which can improve the thermal stability of written bits without increasing the medium noise, so as to enable a reliable high-density recording without introducing adverse effects on the performance of the magnetic recording medium, that is, unnecessarily increasing the magnetic anisotropy.

Another object of the present invention is to provide a magnetic recording medium comprising at least one exchange layer structure, and a magnetic layer formed on the exchange layer structure, where the exchange layer structure comprises a ferromagnetic layer, and a non-magnetic coupling layer provided on the ferromagnetic layer and under the magnetic layer, and the ferromagnetic layer and the magnetic layer have antiparallel magnetizations. According to the magnetic recording medium of the present invention, it is possible to provide a magnetic recording medium which can improve the thermal stability of written bits, so as to enable reliable high-density recording without degrading the overwrite performance.

Still another object of the present invention is to provide a magnetic storage apparatus comprising at least one magnetic recording medium including at least one exchange layer structure and a magnetic layer formed on said exchange layer structure, and at least one head recording information on and/or reproducing information from the recording medium, where the exchange layer structure comprises a ferromagnetic layer and a nonmagnetic coupling layer provided on the ferromagnetic layer and under the magnetic layer, and the ferromagnetic layer and the magnetic layer have antiparallel magnetizations. According to the magnetic storage apparatus of the present invention, it is possible to provide a magnetic storage apparatus which can improve the thermal stability of written bits, so as to enable a reliable high-density recording without introducing adverse effects on the performance of the magnetic recording medium.

Other objects and further features of the present invention will be apparent from the following detailed description when read in conjunction with the accompanying drawings.

DESCRIPTION OF THE PREFERRED EMBODIMENTS

Figure 1:
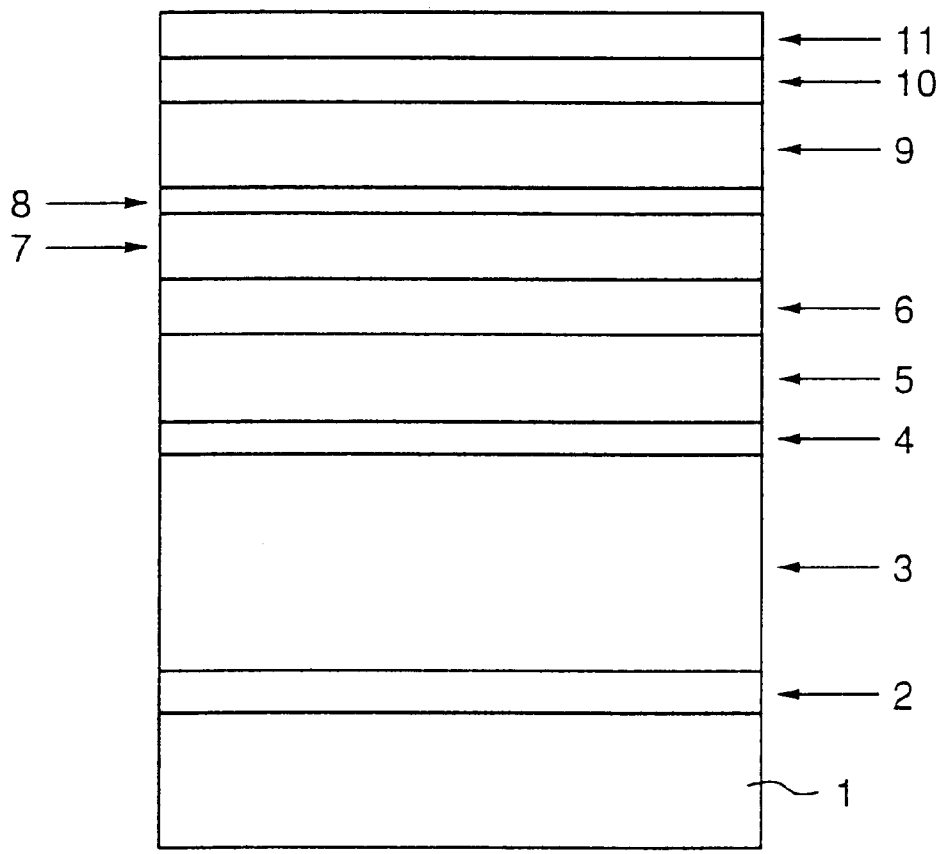
FIG. 1 is a cross sectional view showing an important part of a first embodiment of the magnetic recording medium according to the present invention.

A description will hereinafter be given of embodiments of the present invention, by referring to the drawings.

First, a description will be given of the operating principle of the present invention.

The present invention submits the use of layers with antiparallel magnetization structures. For example, S. S. P. Parkin, "Systematic Variation of the Strength and Oscillation Period of Indirect Magnetic Exchange Coupling through the 3d, 4d, and 5d Transition Metals", Phys. Rev. Lett. Vol. 67, 3598 (1991) describes several magnetic transition metals such as Co, Fe and Ni that are coupled through thin non-magnetic interlayers such as Ru and Rh. On the other hand, a U.S. Pat. No. 5,701,223 proposes a spin-valve which employs the above described layers as laminated pinning layers to stabilize the sensor.

For a particular Ru or Ir layer thickness between two ferromagnetic layers, the magnetizations can be made parallel or antiparallel. For example, for a structure made up of two ferromagnetic layers of different thickness with antiparallel magnetizations, the effective grain size of a magnetic recording medium can be increased without significantly affecting the resolution. A signal amplitude reproduced from such a magnetic recording medium is reduced due to the opposite magnetizations, but this can be rectified by adding another layer of appropriate thickness and magnetization direction, under the laminated magnetic layer structure, to thereby cancel the effect of one of the layers. As a result, it is possible to increase the signal amplitude reproduced from the magnetic recording medium, and to also increase the effective grain volume. Thermally stable written bits can therefore be realized.

The present invention increases the thermal stability of written bits by exchange coupling the magnetic layer to another ferromagnetic layer with an opposite magnetization or, by a laminated ferrimagnetic structure. The ferromagnetic layer or the laminated ferrimagnetic structure is made up of exchange-decoupled grains as the magnetic layer. In other words, the present invention uses an exchange pinning ferromagnetic layer or a ferrimagnetic multilayer to improve the thermal stability performance of the magnetic recording medium.

FIG. 1 is a cross sectional view showing an important part of a first embodiment of a magnetic recording medium according to the present invention.

The magnetic recording medium includes a non-magnetic substrate 1, a first seed layer 2, a NiP layer 3, a second seed layer 4, an underlayer 5, a non-magnetic intermediate layer 6, a ferromagnetic layer 7, a non-magnetic coupling layer 8, a magnetic layer 9, a protection layer 10, and a lubricant layer 11 which are stacked in the order shown in FIG. 1.

For example, the non-magnetic substrate 1 is made of Al, Al alloy or glass. This non-magnetic substrate 1 may or may not be mechanically textured. The first seed layer 2 is made of Cr or Ti, for example, especially in the case where the non-magnetic substrate 1 is made of glass. The NiP layer 3 is preferably oxidized and may or may not be mechanically textured. The second seed layer 4 is provided to promote a (001) or a (112) texture of the underlayer 5 when using a B2 structure alloy such as NiAl and FeAl for the underlayer 5. The second seed layer 4 is made of an appropriate material similar to that of the first seed layer 2.

In a case where the magnetic recording medium is a magnetic disk, the mechanical texturing provided on the non-magnetic substrate 1 or the NiP layer 3 is made in a circumferential direction of the disk, that is, in a direction in which tracks of the disk extend.

The non-magnetic intermediate layer 6 is provided to further promote epitaxy, narrow the grain distribution of the magnetic layer 9, and orient the anisotropy axes of the magnetic layer 9 along a plane parallel to the recording surface of the magnetic recording medium. This non-magnetic intermediate layer 6 is made of a hcp structure alloy such as CoCr-M, where M=B, Mo, Nb, Ta, W or alloys thereof, and has a thickness in a range of 1 to 5 nm.

The ferromagnetic layer 7 is made of Co, Ni, Fe, Co-based alloy, Ni-based alloy, Fe-based alloy or the like. In other words, alloys such as CoCrTa, CoCrPt and CoCrPt-M, where M=B, Mo, Nb, Ta, W or alloys thereof may be used for the ferromagnetic layer 7. This ferromagnetic layer 7 has a thickness in a range of 2 to 10 nm. The non-coupling magnetic layer 8 is made of Ru, Ir, Rh, Ru-based alloy, Ir-based alloy, Rh-based alloy or the like. This non-magnetic coupling layer 8 preferably has a thickness in a range of 0.4 to 0.9 nm, and preferably on the order of approximately 0.8 nm. For this particular thickness range of the non-magnetic coupling layer 8, the magnetizations of the ferromagnetic layer 7 and the magnetic layer 9 are antiparallel. The ferromagnetic layer 7 and the non-magnetic coupling layer 8 form an exchange layer structure.

The magnetic layer 9 is made of Co or a Co-based alloys such as CoCrTa, CoCrPt and CoCrPt-M, where M=B, Mo, Nb, Ta, W or alloys thereof. The magnetic layer 9 has a thickness in a range of 5 to 30 nm. Of course, the magnetic layer 9 is not limited to a single-layer structure, and a multilayer structure may be used for the magnetic layer 9.

The protection layer 10 is made of C, for example. In addition, the lubricant layer 11 is made of an organic lubricant, for example, for use with a magnetic transducer such as a spin-valve head. The protection layer 10 and the lubricant layer 11 form a protection layer structure on the recording surface of the magnetic recording medium.

Obviously, the layer structure under the exchange layer structure is not limited to that shown in FIG. 1. For example, the underlayer 5 may be made of Cr or Cr-based alloy and formed to a thickness in a range of 5 to 40 nm on the substrate 1, and the exchange layer structure may be provided on this underlayer 5.

Next, a description will be given of a second embodiment of the magnetic recording medium according to the present invention.

Figure 2:
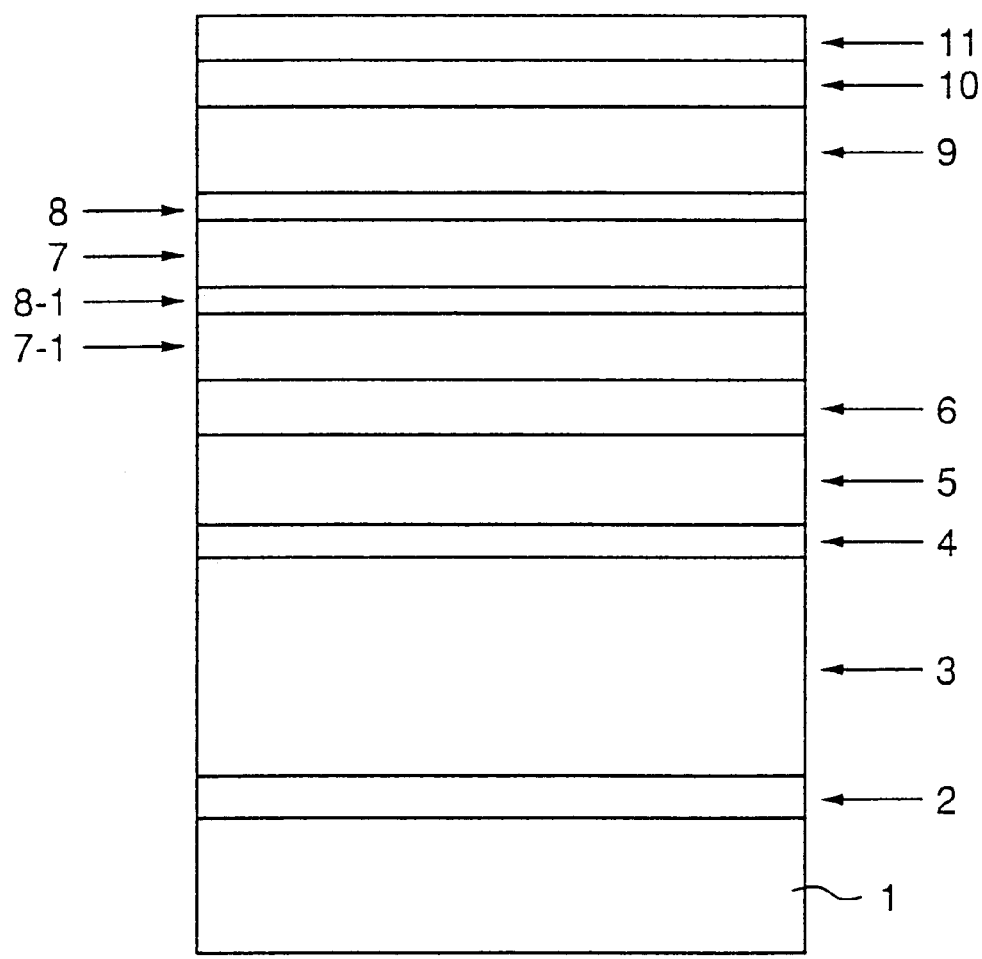
FIG. 2 is a cross sectional view showing an important part of a second embodiment of the magnetic recording medium according to the present invention.

FIG. 2 is a cross sectional view showing an important part of the second embodiment of the magnetic recording medium. In FIG. 2, those parts which are the same as those corresponding parts in FIG. 1 are designated by the same reference numerals, and a description thereof will be omitted.

In this second embodiment of the magnetic recording medium, the exchange layer structure includes two non-magnetic coupling layers 8 and 8-1, and two ferromagnetic layers 7 and 7-1, which form a ferrimagnetic multilayer. This arrangement increases the effective magnetization and signal, since the magnetizations of the two non-magnetic coupling layers 8 and 8-1 cancel each other instead of a portion of the magnetic layer 9. As a result, the grain volume and thermal stability of magnetization of the magnetic layer 9 are effectively increased. More bilayer structures made up of the pair of ferromagnetic layer and non-magnetic coupling layer may be provided additionally to increase the effective grain volume, as long as the easy axis of magnetization are appropriately oriented for the subsequently provided layers.

The ferromagnetic layer 7-1 is made of a material similar to that of ferromagnetic layer 7, and has a thickness range selected similarly to the ferromagnetic layer 7. In addition, the non-magnetic coupling layer 8-1 is made of a material similar to that of the non-magnetic coupling layer 8, and has a thickness range selected similarly to the non-magnetic coupling layer 8. Within the ferromagnetic layers 7-1 and 7, the c-axes are preferably in-plane and the grain growth columnar.

In this embodiment, the magnetic anisotropy of the ferromagnetic layer 7-1 is preferably lower than that of the ferromagnetic layer 7. However, the magnetic anisotropy of the ferromagnetic layer 7-1 may be the same as or, be higher than that of, the ferromagnetic layer 7.

Furthermore, a product of a remanent magnetization and thickness of the ferromagnetic layer 7 may be smaller than that of the ferromagnetic layer 7-1.

Figure 3:
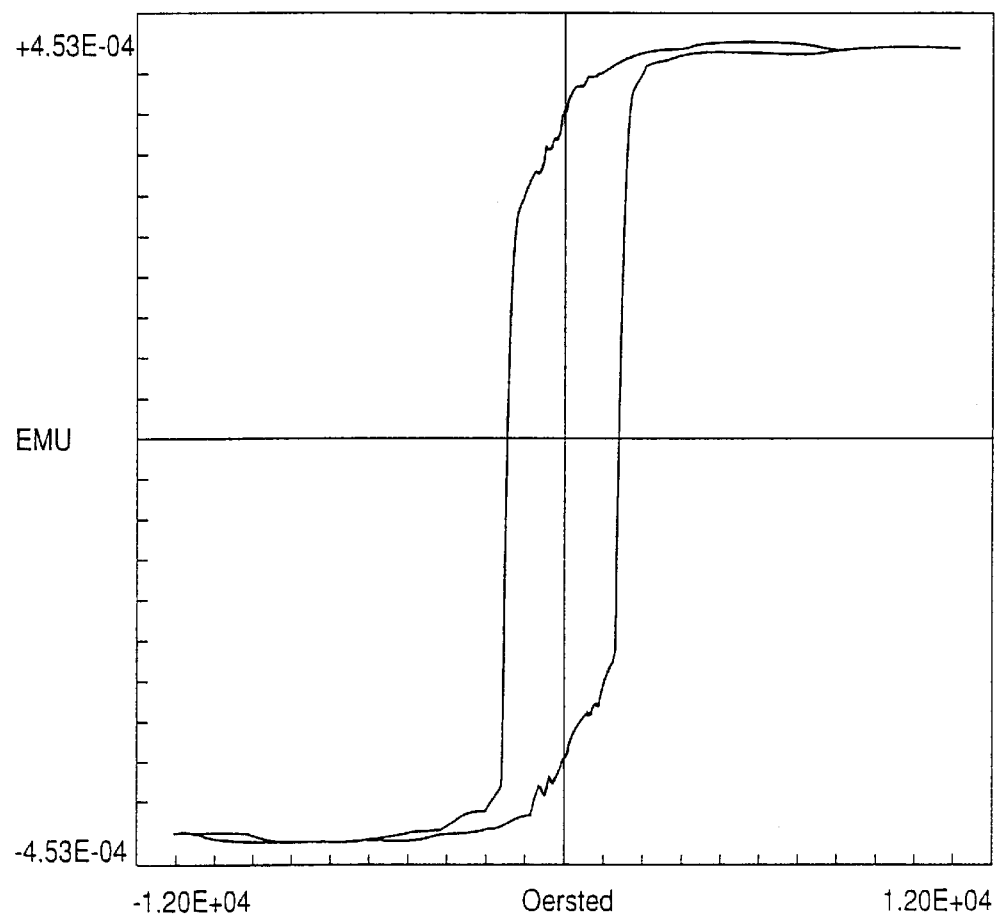
FIG. 3 is a diagram showing an in-plane magnetization curve of a single CoPt layer having a thickness of 10 nm on a Si substrate.

FIG. 3 is a diagram showing an in-plane magnetization curve of a single CoPt layer having a thickness of 10 nm on a Si substrate. In FIG. 3, the ordinate indicates the magnetization (emu), and the abscissa indicates the magnetic field (Oe). Conventional magnetic recording media show a behavior similar to that shown in FIG. 3.

Figure 4:
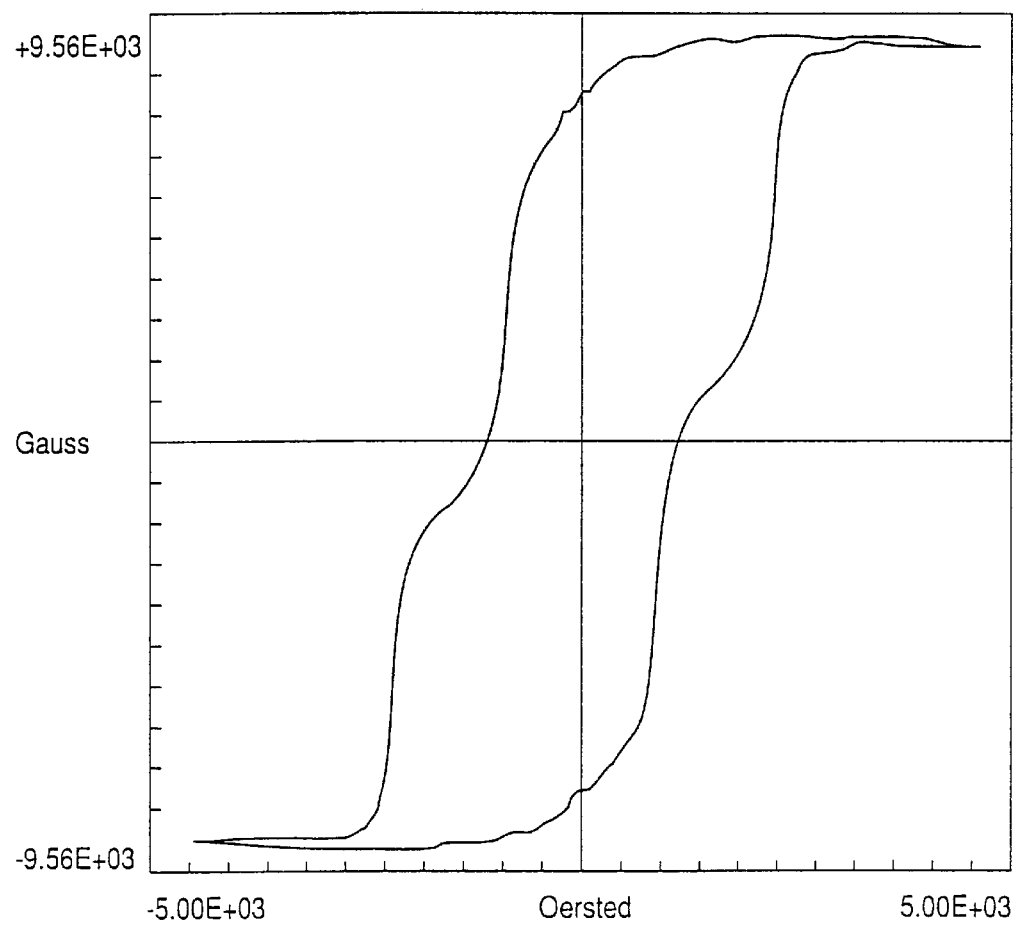
FIG. 4 is a diagram showing an in-plane magnetization curve of two CoPt layers separated by a Ru layer having a thickness of 0.8 nm.

FIG. 4 is a diagram showing an in-plane magnetization curve of two CoPt layers separated by a Ru layer having a thickness of 0.8 nm, as in the case of the first embodiment of the magnetic recording medium. In FIG. 4, the ordinate indicates the magnetization (Gauss), and the abscissa indicates the magnetic field (Oe). As may be seen from FIG. 4, the loop shows shifts near the magnetic field which indicate the antiparallel coupling.

Figure 5:
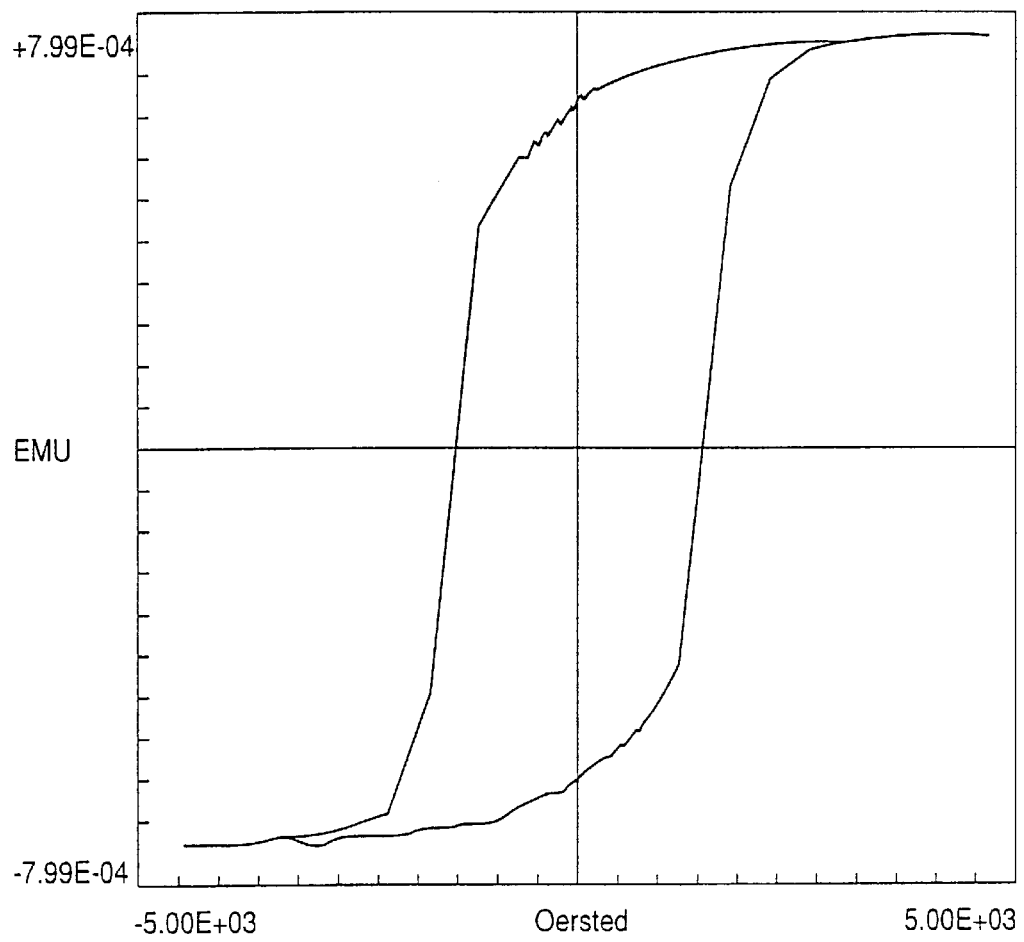
FIG. 5 is a diagram showing an in-plane magnetization curve of two CoPt layers separated by a Ru layer having a thickness of 1.4 nm.

FIG. 5 is a diagram showing an in-plane magnetization curve of two CoPt layers separated by a Ru layer having a thickness of 1.4 nm. In FIG. 5, the ordinate indicates the magnetization (emu), and the abscissa indicates the magnetic field (Oe). As may be seen from FIG. 5, the magnetizations of the two CoPt layers are parallel.

Figure 6:
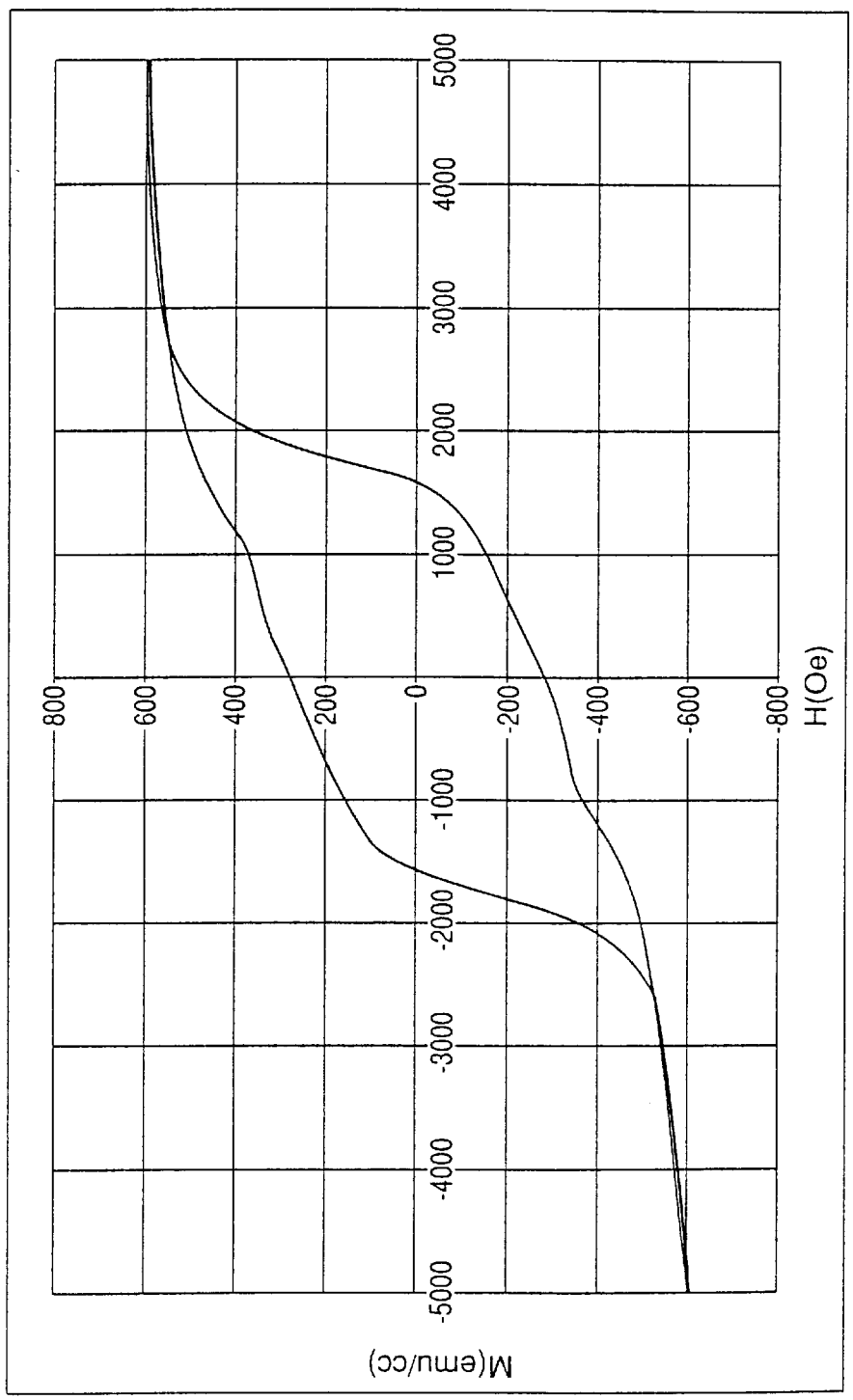
FIG. 6 is a diagram showing an in-plane magnetization curve two CoCrPt layers separated by a Ru having a thickness of 0.8 nm.

FIG. 6 is a diagram showing an in-plane magnetization curve for two CoCrPt layers separated by a Ru having a thickness of 0.8 nm, as in the case of the second embodiment of the magnetic recording medium. In FIG. 6, the ordinate indicates the magnetization (emu/cc), and the abscissa indicates the field (Oe). As may be seen from FIG. 6, the loop shows shifts near the field which indicate the antiparallel coupling.

From FIGS. 3 and 4, it may be seen that the antiparallel coupling can be obtained by the provision of the exchange layer structure. In addition, it may be seen by comparing FIG. 5 with FIGS. 4 and 6, the non-magnetic coupling layer 8 is desirably in the range of 0.4 to 0.9 nm in order to achieve the antiparallel coupling.

Therefore, according to the first and second embodiments of the magnetic recording medium, it is possible to effectively increase the apparent grain volume of the magnetic layer by the exchange coupling provided between the magnetic layer and the ferromagnetic layer via the non-magnetic coupling layer, without sacrificing the resolution. In other words, the apparent thickness of the magnetic layer is increased with regard to the grain volume of the magnetic layer so that a thermally stable medium can be obtained, and in addition, the actual thickness of the magnetic layer is not increased so that the resolution remains unaffected by the increased "apparent thickness" of the magnetic layer. As a result, it is possible to obtain a magnetic recording medium with reduced medium noise and thermally stable performance.

Figure 7:
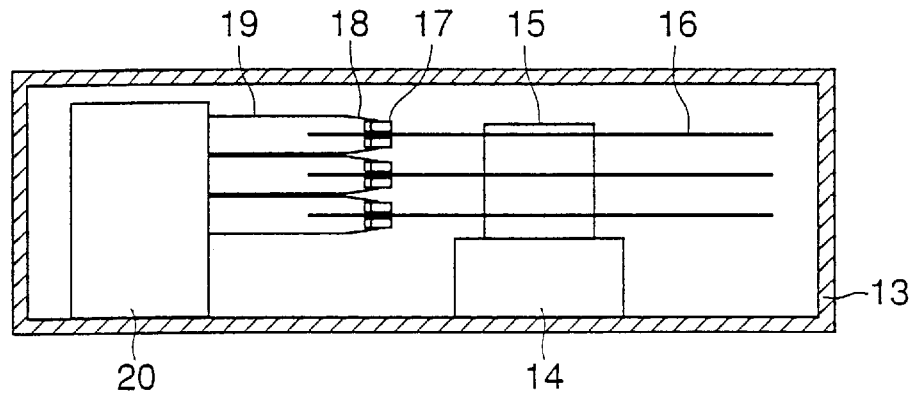
FIG. 7 is a cross sectional view showing an important part of an embodiment of the magnetic storage apparatus according to the present invention.

Next, a description will be given of an embodiment of a magnetic storage apparatus according to the present invention, by referring to FIGS. 7 and 8. FIG. 7 is a cross sectional view showing an important part of this embodiment of the magnetic storage apparatus, and FIG. 8 is a plan view showing the important part of this embodiment of the magnetic storage apparatus.

Figure 8:
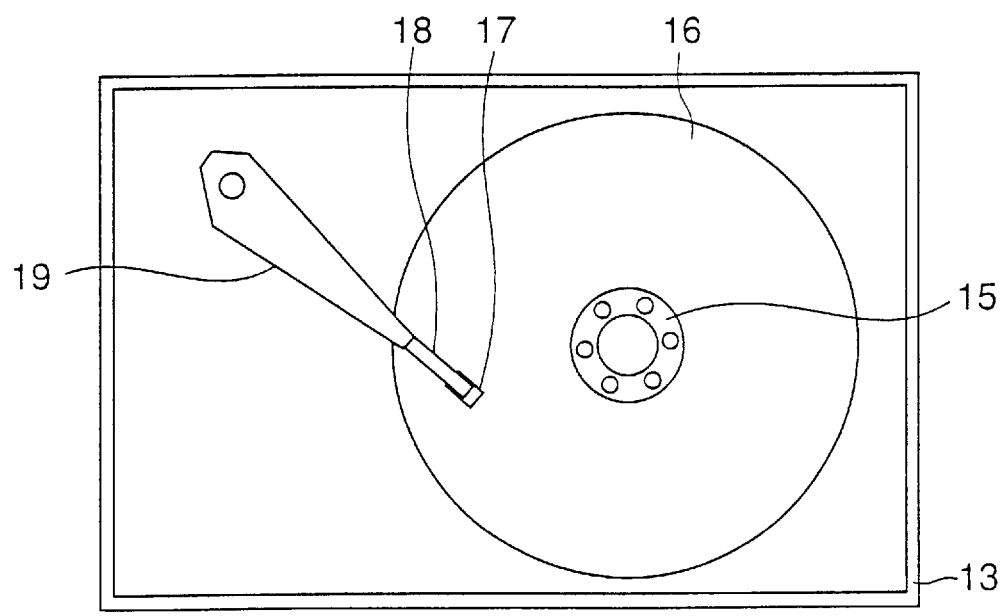
FIG. 8 is a plan view showing the important part of the embodiment of the magnetic storage apparatus.

As shown in FIGS. 7 and 8, the magnetic storage apparatus generally includes a housing 13. A motor 14, a hub 15, a plurality of magnetic recording media 16, a plurality of recording and reproducing heads 17, a plurality of suspensions 18, a plurality of arms 19, and an actuator unit 20 are provided within the housing 13. The magnetic recording media 16 are mounted on the hub 15 which is rotated by the motor 14. The recording and reproducing head 17 is made up of a reproducing head such as a MR or GMR head, and a recording head such as an inductive head. Each recording and reproducing head 17 is mounted on the tip end of a corresponding arm 19 via the suspension 18. The arms 19 are moved by the actuator unit 20. The basic construction of this magnetic storage apparatus is known, and a detailed description thereof will be omitted in this specification.

This embodiment of the magnetic storage apparatus is characterized by the magnetic recording media 16. Each magnetic recording medium 16 has the structure of the first or second embodiment of the magnetic recording medium described above in conjunction with FIGS. 1 and 2. Of course, the number of magnetic recording media 16 is not limited to three, and only one, two or four or more magnetic recording media 16 may be provided.

The basic construction of the magnetic storage unit is not limited to that shown in FIGS. 7 and 8. In addition, the magnetic recording medium used in the present invention is not limited to a magnetic disk.

Therefore, according to the present invention, it is possible to provide a magnetic recording medium and a magnetic storage apparatus, which can improve the thermal stability of written bits and reduce the medium noise, so as to enable reliable high-density recording without introducing adverse effects on the performance of the magnetic recording medium.

Further, the present invention is not limited to these embodiments, but various variations and modifications may be made without departing from the scope of the present invention.

What is claimed is:

1. A magnetic storage apparatus comprising:
   at least one magnetic recording medium including at least one exchange layer structure, and a magnetic layer formed on said exchange layer structure; and
   at least one head recording information on and/or reproducing information from the recording medium,
   said exchange layer structure including:
      a ferromagnetic layer; and
      a non-magnetic coupling layer provided on said ferromagnetic layer and under said magnetic layer,
   said ferromagnetic layer and said magnetic layer having antiparallel magnetizations.

2. The magnetic storage apparatus as claimed in claim 1, wherein said ferromagnetic layer is made of a material selected from a group consisting of Co, Ni, Fe, Ni alloys, Fe alloys, and Co alloys.

3. The magnetic storage apparatus as claimed in claim 1, wherein said ferromagnetic layer has a thickness in a range of 2 to 10 nm.

4. The magnetic storage apparatus as claimed in claim 1, wherein said non-magnetic coupling layer is made of a material selected from a group consisting of Ru, Rh, Ir, Ru alloys, Rh alloys, and Ir alloys.

5. The magnetic storage apparatus as claimed in claim 1, wherein said non-magnetic coupling layer has a thickness in a range of 0.4 to 0.9 nm.

6. The magnetic storage apparatus as claimed in claim 1, wherein said magnetic layer is made of a material selected from a group consisting of Co, and Co alloys.

7. The magnetic storage apparatus as claimed in claim 1, wherein said magnetic recording medium is adapted for longitudinal magnetic recording.

8. A magnetic storage apparatus, comprising:
   at least one magnetic recording medium adapted for longitudinal recording and including at least one exchange layer structure, and a magnetic layer formed on said exchange layer structure; and
   at least one head recording information on and/or reproducing information from the recording medium,
   said exchange layer structure including:
      a ferromagnetic layer having a thickness in a range of 2 to 10 nm; and
      a non-magnetic coupling layer provided on said ferromagnetic layer and under said magnetic layer,
      said ferromagnetic layer and said magnetic layer having antiparallel magnetizations.

9. The magnetic storage apparatus as claimed in claim 8, wherein said non-magnetic coupling layer has a thickness in a range of 0.4 to 0.9 nm.

10. A magnetic storage apparatus comprising:
    at least one magnetic recording medium adapted for longitudinal magnetic recording and including at least one exchange layer structure; and a magnetic layer formed on said exchange layer structure;
    at least one head recording information on and/or reproducing information from the recording medium,
    said exchange layer structure including:
       a ferromagnetic layer; and
       a non-magnetic coupling layer, having a thickness in a range of 0.4 to 0.9 nm, provided on said ferromagnetic layer and under said magnetic layer,
    said ferromagnetic layer and said magnetic layer having antiparallel magnetizations.

11. A magnetic storage apparatus comprising:
    at least one magnetic recording medium adapted for longitudinal magnetic recording and including at least one exchange layer structure, and a magnetic layer formed on said exchange layer structure,
    at least one head recording information on and/or reproducing information from the recording medium,
    said exchange layer structure including:
       a ferromagnetic layer; and
       a non-magnetic coupling layer, having a thickness of approximately 0.8 nm, provided on said ferromagnetic layer and under said magnetic layer, said ferromagnetic layer and said magnetic layer having antiparallel magnetizations.

12. The magnetic storage apparatus as claimed in claim 1, wherein said ferromagnetic layer is made of a material selected from a group consisting of CoCrTa, CoCrPt and CoCrPt-M, where M=B, Mo, Nb, Ta, W or alloys thereof.

13. The magnetic storage apparatus as claimed in claim 1, wherein said magnetic layer is made of a material selected from a group consisting of CoCrTa, CoCrPt and CoCrPt-M, where M=B, Mo, Nb, Ta, W or alloys thereof.

* * * * *